(12) United States Patent
Morales

(10) Patent No.: US 8,570,553 B2
(45) Date of Patent: Oct. 29, 2013

(54) SYSTEM AND METHOD FOR COMPILING PRINT JOB SEGMENTS OR COMPOSITE PRINT JOBS IN A PRINTING SYSTEM

(75) Inventor: Javier A Morales, Irondequoit, NY (US)

(73) Assignee: Xerox Corporation, Norwalk, CT (US)

( * ) Notice: Subject to any disclaimer, the term of this patent is extended or adjusted under 35 U.S.C. 154(b) by 1582 days.

(21) Appl. No.: 12/112,597

(22) Filed: Apr. 30, 2008

(65) Prior Publication Data
US 2009/0273800 A1    Nov. 5, 2009

(51) Int. Cl.
G06F 3/12    (2006.01)
(52) U.S. Cl.
USPC ......................................... 358/1.15
(58) Field of Classification Search
None
See application file for complete search history.

(56) References Cited

U.S. PATENT DOCUMENTS

| 5,493,634 | A | 2/1996 | Bonk et al. |
| 5,559,606 | A | 9/1996 | Webster |
| 5,615,015 | A | 3/1997 | Krist et al. |
| 7,079,266 | B1 | 7/2006 | Rai et al. |
| 7,092,963 | B2 | 8/2006 | Ryan et al. |
| 2003/0086117 | A1* | 5/2003 | Lester et al. ............. 358/1.15 |
| 2003/0227642 | A1* | 12/2003 | Anderson et al. ........ 358/1.13 |

OTHER PUBLICATIONS

Harrington, S. and Buckley, R.; "Document Printing," In Interpress The Source Book; Xerox Corporation; Publisher, A Brady Book, Simon & Schuster, Inc., New York, NY, US; 1988; Chapter 8, pp. 318-379.

* cited by examiner

*Primary Examiner* — Jeremiah Bryar

(57) ABSTRACT

A system is provided for compiling a multi-part print job. The system is adapted to receive a first print job part at a first print system gateway, and responsive to determining that the first print job part is part of the multi-part job, the first print job segment in memory. A second print job segment is received at a second print system gateway and responsive to determining that the second print job part is part of the multi-part job, the second print job segment in memory. When a selected condition is met, both the first and second print job segments are released from memory for processing as the multi-part print job with an electronic document processing system.

26 Claims, 3 Drawing Sheets

SYSTEM AND METHOD FOR COMPILING PRINT JOB SEGMENTS OR COMPOSITE PRINT JOBS IN A PRINTING SYSTEM

BACKGROUND AND SUMMARY

The disclosed embodiments relate generally to a print job development technique and, more particularly, to an approach for automatically compiling either a group of print job segments (to form a multi-part print job) or a group of print jobs (to form a composite print job).

Publishing applications can be advantageously used to compile and produce large documents. The large documents may be constructed from small documents or document fragments, thus allowing several persons to work simultaneously. Various components of a large document can be encoded in a page description language (such as Xerox's Interpress® or Adobe's PostScript®) and stored for processing. Methods of assembling these components (in the form of Interpress® files) are taught in chapter 8 of *Interpress the Source Book* by Steven J. Harrington and Robert R. Buckley (published by Simon & Schuster, Inc. in 1988). This method of assembly presumes, of course, the manual collection of all documents or document fragments in one convenient location. Such collection, however, can be challenging in a large network printing system having many remote client sources communicating with a complex printing system by way of many gateways.

Various printing systems capable of processing complex jobs are known. For instance, U.S. Pat. No. 7,092,963 B2 to Ryan et al., the pertinent portions of which are incorporated herein by reference, discloses a print production and finishing system for electronic management and control of a wide range of finishing processes characterized by input from multiple production operations and equipment that, depending upon the job, might be variably applied to work pieces that themselves are highly variable between different jobs. As with the publishing applications described above, the '963 patent does not appear to contemplate an approach for compiling multiple job parts from various client sources communicating with a printing system by way of multiple gateways.

Indeed, compiling multi-part jobs can be problematic in network document processing systems having various client sources communicating with a printing system by way of multiple gateways and/or multiple submission mechanisms since one job segment (associated with one job submission mechanism) might pass through a first gateway at a first time without the system knowing that another related job segment (possibly associated with another job submission mechanism) is passing through a second gateway at a second time. Because the relationship of the job segments or parts is not recognized across the multiple gateways, collection of all related job segments downstream of the gateways for the kind of assembly or compilation alluded to above can be highly problematic.

In accordance with one aspect of the disclosed embodiments there is disclosed a system for compiling a multi-part print job having two or more print job segments for processing with an electronic document processing system. The system includes: (A) a memory; (B) a memory manager communicating with said memory; (C) a first print system gateway, communicating with said memory manager, at which a first print job segment is received, said first print system gateway being used to determine that the first print job segment is part of the multi-part print job, wherein, responsive to determining that the first print job segment is part of the multi-part print job, said memory manager causes the first print job segment to be stored in said memory until a selected condition is met; (D) a second print system gateway, communicating with said memory manager, at which a second print job segment is received, said second print system gateway being used to determine that the second print job segment is part of the multi-part print job, wherein, responsive to said determining that the second print job segment is part of the multi-part print job, said memory manager causes the second print job segment to be stored in said memory until the selected condition is met; and (E) wherein when the selected condition is met, said memory manager causes both the first and second print job segments to be released from said memory for processing as the multi-part print job with the electronic document processing system.

In accordance with another aspect of the disclosed embodiments there is disclosed a system for compiling a composite print job having two or more jobs for processing with an electronic document processing system. The system includes: (A) a memory; (B) a memory manager communicating with said memory; (C) a first print system gateway, communicating with said memory manager, at which a first job is received, said first print system gateway being used to determine that the first job is part of the composite print job, wherein, responsive to determining that the first job is part of the composite print job, said memory manager causes the first job to be stored in said memory until a selected condition is met; (D) a second print system gateway, communicating with said memory manager, at which a second job is received, said second print system gateway being used to determine that the second job is part of the composite print job, wherein, responsive to said determining that the second job is part of the composite job, said memory manager causes the second job to be stored in said memory until the selected condition is met; and (E) wherein when the selected condition is met, said memory manager causes both the first and second jobs to be released from said memory for processing as the composite job with the electronic document processing system.

In accordance with yet another aspect of the disclosed embodiments there is disclosed a method for compiling a multi-part print job having two or more print job segments for processing with an electronic document processing system. The method includes: (A) receiving a first print job segment at a first print system gateway; (B) determining, with the first print system gateway, that the first print job segment is part of the multi-part print job; (C) responsive to said (B), storing the first print job segment in memory; (D) receiving a second print job segment at a second print system gateway; (E) determining, with the second print system gateway, that the second print job segment is part of the multi-part print job; (F) responsive to said (E), storing the second print job segment in memory; wherein the first print job segment is associated with the second print job segment; and (G) when a selected condition is met, releasing both the first and second print job segments for processing as the multi-part print job with the electronic document processing system.

In accordance with another aspect of the disclosed embodiments there is disclosed a method for compiling a composite print job having two or more jobs for processing with an electronic document processing system. The method includes: (A) receiving a first job at a first print system gateway; (B) determining, with the first print system gateway, that the first job is part of the composite print job; (C) responsive to said (B), storing the first job in memory; (D) receiving a second job at a second print system gateway; (E) determining, with the second print system gateway, that the second job is part of the composite print job; (F) responsive to said (E), storing the second job in memory; wherein the first job is associated with the second job; and (G) when a selected condition is met, releasing both the first and second jobs for processing as the composite print job with the electronic document processing system.

DESCRIPTION OF DISCLOSED EMBODIMENTS

Figure 1:
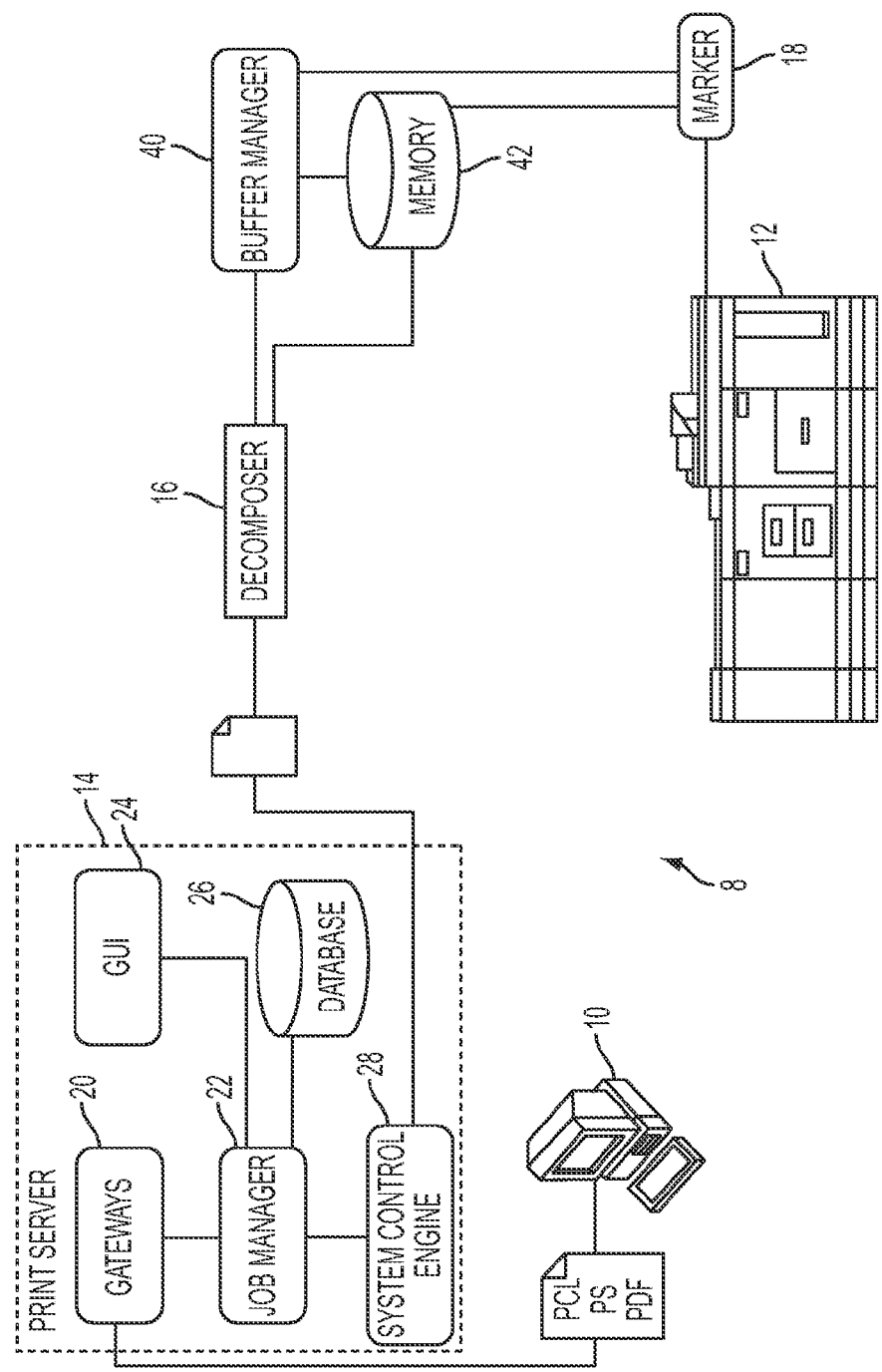
FIG. 1 includes both a plan view and a block diagram of a print production system, at least a part of which print production system serves as a supporting platform for the disclosed embodiments.

Referring now FIG. 1, a print production system, constructed in accordance with the disclosed embodiments is designated by the numeral 8. While the below description refers to a commercially-available product, namely Xerox DocuSP, it will be appreciated that the disclosed embodiments are not limited to such a specific implementation. Jobs comprising image data to be printed are submitted from one of a plurality of job submission clients 10, which of course could be any of a large number of computers on a network (not shown). The jobs from the clients 10 are ultimately intended to be printed on a high-speed digital printing apparatus 12. Interposed between the client 10 and the printing apparatus 12 is a print server indicated as 14, a decomposing subsystem 16, a buffer manager 40 and a marker 18. In the preferred embodiment of the present invention, the print server 14 includes certain elements of the commercially-available DocuSP. Buffer manager 40 may collect image data from subsystem 16 until marker 18 is ready. Marker 18 is intended to represent the software, which is directly operative of the printing apparatus 12, which provides hardcopy output images.

While not shown in FIG. 1, the high-speed digital printing apparatus may be associated with a wide range of finishing devices of the type shown and discussed in U.S. Pat. No. 5,559,606 to Webster et al., the pertinent portions of which are incorporated herein by reference. Moreover, as illustrated in U.S. Pat. No. 7,079,266 to Rai et al., the pertinent portions of which are incorporated herein by reference, other job execution functions (such as mailing) may be provided with the print production system 8.

Referring to print server 14 of FIG. 1, jobs submitted from client 10 pass through one or more gateways 20, which interacts with a job manager 22. The job manager 22 is the interface of the print server to the user, and would typically be apparent to the user through a screen on the client's computer, as indicated by graphical user interface (GUI) 24. The job manager 22 also interfaces with a database 26 which includes software that would, for example, enable the client to select, for example stapling, duplex, output, and other options. The job manager 22 further interfaces with a system control engine 28, which directs each job to the subsystem 16, and interfaces with marker 18 to exercise some control over the hardware in printing apparatus 12, such as staplers, output trays, and feeders.

The disclosed embodiment may include data queuing or job queuing capability, the functionality of which may be implemented with the subsystem 16 in coordination with a buffer manager 40. Buffer manager 40 interacts with the subsystem 16 and a memory indicated as 42. As is familiar in the art of network printing, memory 42 may, among other things, be used to temporarily retain decomposed page image data emerging from one of the decomposers, until such time as the data for the particular page image is required by marker 18 for immediate submission to printing apparatus 12. As will be appreciated by reference to U.S. Pat. No. 5,493,634 to Bonk et al., the pertinent portions of which are incorporated herein by reference, a large range of information, other than image data, may be stored in memory 42. For instance, a wide range of content related and instruction related information may be stored. Moreover, as demonstrated by the '634 patent, a wide variety of managers (i.e., processors) may be used to manipulate and control the movement of the stored information.

The subsystem 16 is responsible for taking image data in a PDL and for generating the decomposed image data to be printed on the printing apparatus 12. The decomposing subsystem 16 may be, for example, a PostScript® interpreter or a PCL interpreter. A complete background discussion of decomposing is provided in U.S. Pat. No. 5,615,015 to Hube, the pertinent portions of which are incorporated herein by reference.

Figure 2:
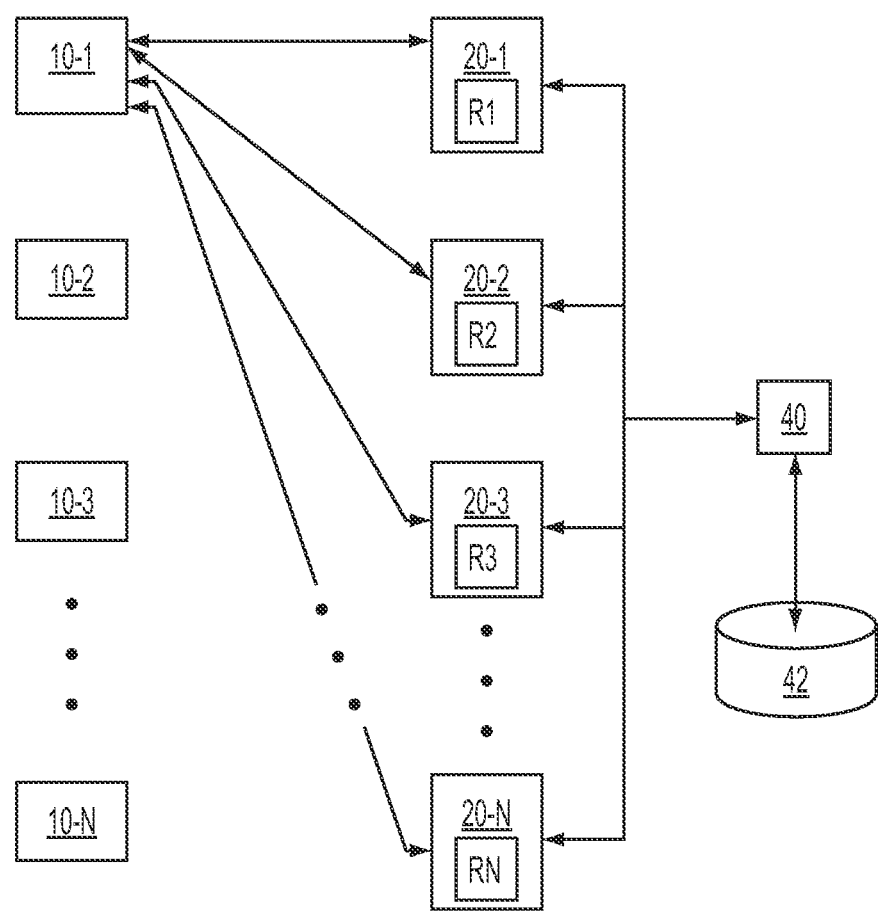
FIG. 2 is a block diagram illustrating selected components of the print production system of FIG. 1.

Referring now to FIG. 2, selected aspects of the print production system 8 are shown. In particular, the clients or sources 10 (designated as 10-1, 10-2, 10-3, . . . 10-N) communicate with gateways 20 (designated as 20-1, 20-2, 20-3, . . . 20-N). Each gateway 20 is capable of communicating bilaterally with one or more of the clients 10 by way of one of several known job submission mechanisms, the significance of which will appear from the description below. By way of example, client 10-1 is shown communicating with each of gateways 20; however it should be understood that, as contemplated by the disclosed embodiments, each one of the clients 10 is capable of communicating with each one of gateways 20. Each gateway may be provided with a set of rules R(i) (designated in FIG. 2 as R1, R2, R3, . . . RN), the rules being used, as described in further detail below, to recognize related job segments or jobs (for ease of description, job segments and jobs may be referred to hereinafter as "job parts"). It should be recognized that each gateway can be provided with a common, comprehensive set of rules or, alternatively, the content of each rule set can be provided on a gateway by gateway basis.

Related job parts, under the control of buffer manager 40, may be buffered in the memory 42. After a requisite number job parts have been collected, the buffer manager may cause a corresponding collection of job parts, i.e., a multi-part job (a job composed of two or more job segments) or composite job (a job composed of two or more jobs) to be released to the marker 18 for printing (and then possibly finishing).

The following description relates to an exemplary compilation technique suited for use with the above-described print production system. In particular, 1. A customer service representative (CSR) might direct the above-described system to submit all required production job parts to production once a job is ready for production. At least one production job part might include one or more PDLs representing the content the customer wants produced and another job part may include PDLs for ancillary information. The latter may include content or information required for production (such as pick & pack lists and shipping labels) as well as ancillary content for the customer (such as packing lists and invoices). Referring to FIG. 1 or 2, this information may be provided from whatever upstream system or client 10 containing that information. In some cases this will mean submission from multiple upstream systems that are not integrated or even aware of each other.

2. As different jobs are received from multiple systems or clients, the production system may determine which job parts are parts of a multi-part job or composite job. As used herein, a "composite job" is a compilation of multiple jobs. In one instance, one job may be directed toward content, while another related job may include instructions for finishing the composite job. There are several ways in which related job parts may be determined or recognized, for example:

a. If an upstream system or client is capable of submitting PDLs with robust job ticketing (e.g., JDF or XPIF), the CSR may require the client to include an order number or some other identifier on the job ticket that's submitted for production.

b. If the upstream system cannot include job ticketing with the created PDL, then the identifier may be embedded in an alternate location such as with the job name or in metadata associated with the PDL.

As will appear, the identifier is used to group independently received job parts into a single multi-part or composite job. Continuing with the description of the exemplary compilation technique:

3. As jobs are sent to the production system, via the gateways 20 (FIG. 2), each corresponding rule set [R(i)] may include a search strategy algorithm for recognizing an identifier associated with a given job. For example:

a. A given set of rules may associate each job submission method with a location for the order information (e.g., JDF Order Number attribute for JMF submission, Job Notes field for IPP submission, PDF keywords for Hot folder submission).

b. In cases where multiple upstream systems share a submission method (e.g., more than one system uses hot folder submission) the production system would have a finer granularity of configuration so that a given identifier can be recognized even when it originates from one of several systems 10 each having the same job submission approach.

Because of the way in which the rules are written, an identifier can be recognized with R(i), notwithstanding the type of job mechanism used to communicate the identifier to the corresponding gateway. Since the rules are written so as to recognize an identifier notwithstanding either its location in a job part or its job submission origin, the identifiers corresponding with a multi-part or composite job are said to be "normalized."

4. Referring to FIGS. 1 and 2, the gateways 20 may pass job parts with normalized identifiers to memory 42 for buffering. In one form or operation, the memory manager 40 monitors the memory 42 to determine when all the parts of a multi-part or composite job have been collected. Since the upstream systems 10 are not integrated with each other, the production system should preferably have some way to determine when all the job parts have been received. This could be done in a variety of ways. For example:

a. The system could be configured to expect job parts from a predefined list of submission mechanisms. By reference to the list, the system can then determine when it has received all job parts for a multi-part or composite job. As an alternative to the list, each job part might include a code indicating, among other things, the context of a job part to the multi-part or composite job as a whole (e.g., a job part may be designated with a code indicating "segment 2 of 4 segments). In turn, by monitoring the incoming codes, the memory manager 40 could determine when the buffered job parts should be released.

b. The system could also be configured to hold the multi-part jobs until one of several conditions is met. In one example, an operator might be responsible for releasing a set of buffered jobs. In another example, the buffered jobs might be released after a preset time interval has elapsed.

Once all jobs parts are received at memory 42, the system treats the multi-part job as it would treat any other multi-part job.

Figure 3:
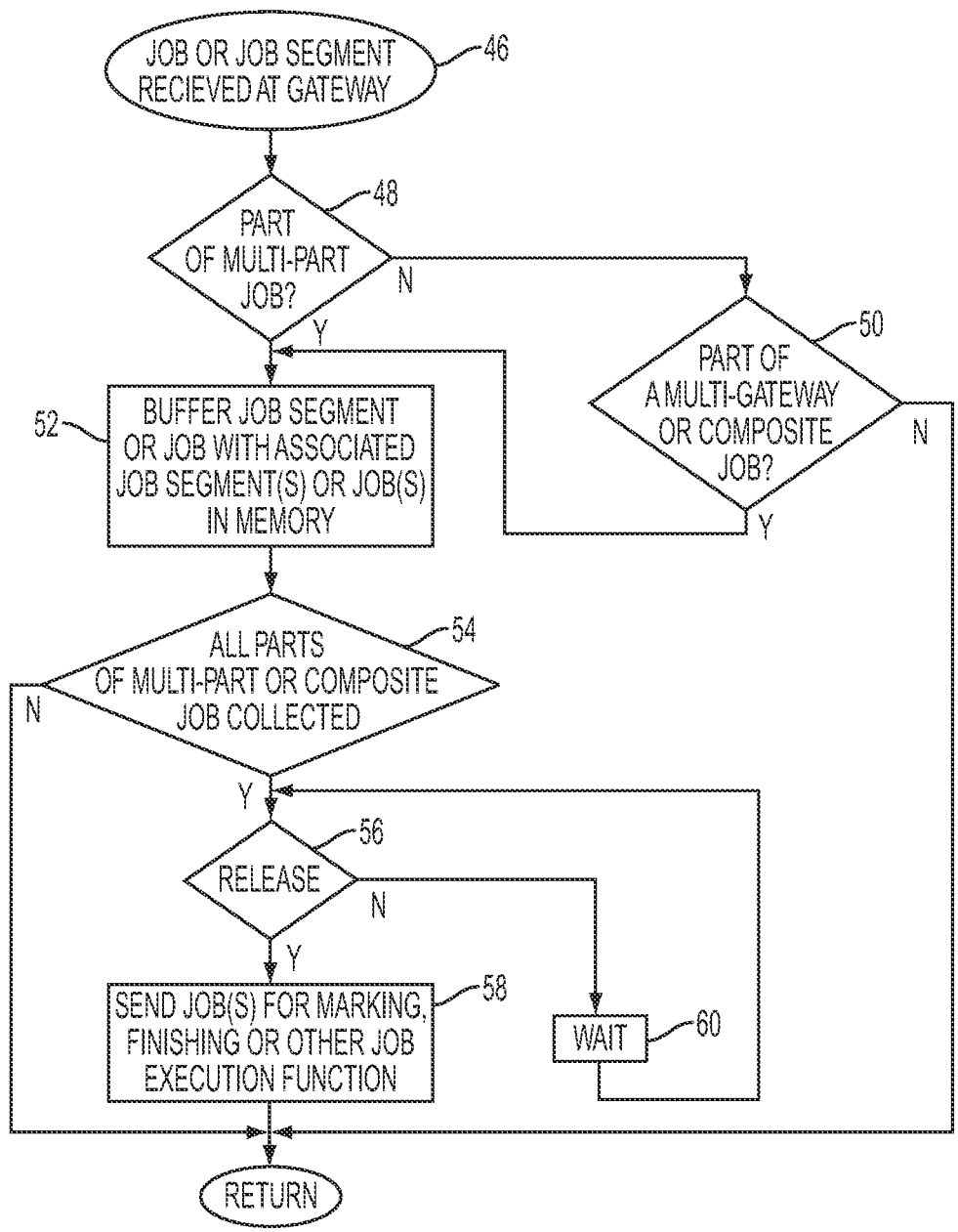
FIG. 3 is a flow chart illustrating some of the functionality associated with a multi-part or composite job compiling approach.

Referring to FIG. 3, a compilation program for use with the above-described print production system is described. Pursuant to the program, as a job or job segment is received at one of gateways 20 (46), an inquiry is made (48) to determine whether the incoming job part is a job segment for a multi-part job. If the incoming job part is not a job segment for a multi-part job, then an inquiry is made (50) to determine whether the job part is a job for a multi-gateway or composite job. If the answers to 48 and 50 are both negative, then the process returns to check other job parts. If the answer to either 48 or 50 is positive, then the incoming job segment or job is buffered (52) with other associated job segment(s) or job(s).

It should be noted that job segments for multiple jobs can be buffered in memory 42 (FIG. 1) at the same time. In one example, a job segment corresponding with a first job may be transmitted to memory 42 (for buffering) while a job segment corresponding with a second job is being transmitted to memory 42 (for buffering).

Once all of the parts of a multi-part or composite job have been collected (positive answer for inquiry 54), an inquiry is made (56) to determine if a release condition, of the type described above, has been met. If the release condition has been met, the job segments or jobs are released to the marker 18 (58) for processing at the printing apparatus 12 (in accordance with how any multi-part or composite job might be treated); otherwise, the system waits (60) until the release condition has been met.

Based on the above description, the following features of a job part compilation scheme should now be apparent. With respect to compiling job segments for a multi-part print job:

A first print system gateway is provided with a first set of rules and a second print system gateway is provided with a second set of rules. In turn, the first set of rules can be used to determine that a first print job segment is part of the multi-part print job, and a second set of rules can be used to determine that a second print job segment is part of the multi-part print job. Each one of the first and second sets of rules may be configured to recognize print job segments corresponding with more than one job submission mechanism type In one example, a context of the first print job segment to the multi-part job is recognized, or a context of the second print job segment to the multi-part job is recognized. The recognizing of the context of the first print job segment may include reading a code in the first print job segment, while recognizing of the context of the second print job segment may include reading a code in the second print job segment.

In another example, a print job segment corresponding with a first print job segment may be transmitted to memory (for buffering) while a print job segment corresponding with a second print job is being transmitted to memory (for buffering). In any event, multiple print job segments corresponding with two or more multi-part print jobs may be buffered in memory at the same time.

Buffered first and second print job segments may be released pursuant to a selected condition. The selected condition may be met when all print segments indicated in a list are stored in memory. Alternatively, the selected condition may be met after a selected time interval has expired.

Each one of the first and second print job segments can include a location, wherein determining that the first print job segment is part of the multi-part job may include recognizing an identifier in the location of the first print job segment, and determining that the second print job segment is part of the multi-part job may include recognizing the identifier in the location of the second print job segment. Each location may be preset so that a preset location of the first print job segment may be used to recognize the identifier, and the preset location of the second print job segment may be used to recognize the identifier.

The job part compilation scheme may also include supplying the first print system gateway with a first set of rules and the second print system gateway with a second set of rules, wherein the first set of rules defines a way in which the first print system gateway is to search for the identifier and the second set of rules defines a way in which the second print system gateway is to search for the identifier. Each one of the first print job segment and the second print job segment may be associated with a job submission type, wherein each one of the first set of rules and the second set of rules is configured to use the job submission type in searching for the identifier.

With respect to compiling jobs for a composite print job:

A first set of rules can be used to determine that a first job is part of a composite print job, and a second set of rules can be used to determine that a second job is part of the composite print job. Each one of the first and second sets of rules may be configured to recognize jobs corresponding with more than one job submission mechanism type Each one of the first and second jobs can include a location, wherein determining that the first job is part of the composite job may include recognizing an identifier in the location of the first job, and determining that the second job is part of the composite job may include recognizing the identifier in the location of the second job.

The claims, as originally presented and as possibly amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

What is claimed is:

1. A system for compiling a multi-part print job, having two or more non-print ready print job segments, to be printed, comprising:

a printing system;
a memory;
a memory manager, operatively connected to said memory; and
a print server;
said print server including,
    a first print system gateway, operatively connected to said memory, to receive a first non-print ready print job segment from a first client device, and
    a second print system gateway, operatively connected to said memory, to receive a second non-print ready print job segment from a second client device, said second non-print ready print job segment from said second client device being received independently from said first non-print ready print job segment from said first client device;
said first print system gateway determining if the first non-print ready print job segment is part of the multi-part print job;
said first print system gateway, when it is determined that the first non-print ready print job segment is part of the multi-part print job, transmitting, to said memory to store the first non-print ready print job segment;
said second print system gateway determining if the second non-print ready print job segment is part of the multi-part print job;
said second print system gateway, when it is determined that the second non-print ready print job segment is part of the multi-part print job, transmitting, to said memory to store the second non-print ready print job segment;
said memory manager determining if a predetermined condition has been met;
said memory manager causing, when said memory manager has determined that the predetermined condition has been met, first and second non-print ready print job segments to be released, from said memory, to said printing system, for processing as the multi-part print job.

2. The system of claim 1, wherein said first print system gateway includes a first set of rules and said second print system gateway includes a second set of rules;
said first print system gateway determining that the first non-print ready print job segment is part of the multi-part job on the basis of the first set of rules;
said second print system gateway determining that the second non-print ready print job segment is part of the multi-part job on the basis the second set of rules.

3. The system of claim 2, wherein the first and second sets of rules are configured to recognize non-print ready print job segments corresponding to more than one job submission mechanism type.

4. The system of claim 1, wherein the first and second print job segments include a location;
said first print system gateway determining that the first non-print ready print job segment is part of the multi-part job by recognizing an identifier in the location of the first non-print ready print job segment;
said second print system gateway determining that the second non-print ready print job segment is part of the multi-part job by recognizing the identifier in the location of the second non-print ready print job segment.

5. The system of claim 4, wherein each location is preset;
said first print system gateway determining that the first non-print ready print job segment is part of the multi-part job by using the preset location of the first non-print ready print job segment to recognize the identifier;

said second print system gateway determining that the second non-print ready print job segment is part of the multi-part job by using the preset location of the second non-print ready print job segment to recognize the identifier.

6. The system of claim 4, wherein said first print system gateway includes a first set of rules and said second print system gateway includes a second set of rules;
said first set of rules defining a way in which said first print system gateway is to search for the identifier;
said second set of rules defining a way in which said second print system gateway is to search for the identifier.

7. The system of claim 1, wherein the multi-part job comprises a first multi-part job;
said first print system gateway receiving a third non-print ready print job segment corresponding with a second multi-part job;
said memory storing the third non-print ready print job segment;
said memory storing the third non-print ready print job segment prior to the release of the first and second print job segments from said memory.

8. A system for compiling a composite print job, having two or more jobs, to be printed, comprising:
a printing system;
a memory;
a memory manager, operatively connected to said memory; and
a print server;
said print server including,
a first print system gateway, operatively connected to said memory, to receive a first non-print ready print job from a first client device, and
a second print system gateway, operatively connected to said memory, to receive a second non-print ready print job from a second client device, said second non-print ready print job from said second client device being received independently from said first non-print ready print job from said first client device;
said first print system gateway determining if the first non-print ready print job is part of the composite print job;
said first print system gateway, when it is determined that the first non-print ready print job is part of the composite print job, transmitting, to said memory to store the first non-print ready print job;
said second print system gateway determining if the second non-print ready print job is part of the composite print job;
said second print system gateway, when it is determined that the second non-print ready print job is part of the composite print job, transmitting, to said memory to store the second non-print ready print job;
said memory manager determining if a predetermined condition has been met;
said memory manager causing, when said memory manager has determined that the predetermined condition has been met, first and second non-print ready print jobs to be released from said memory, to said printing system, for processing as the composite print job.

9. The system of claim 8, wherein said first print system gateway includes a first set of rules and said second print system gateway includes a second set of rules;
said first print system gateway determining that the first non-print ready print job is part of the composite job on the basis of the first set of rules;
said second print system gateway determining that the second non-print ready print job is part of the composite job on the basis the second set of rules.

10. The system of claim 9, wherein the first and second sets of rules are configured to recognize print jobs corresponding to more than one job submission mechanism type.

11. The system of claim 8, wherein the first and second non-print ready print job include a location;
said first print system gateway determining that the first non-print ready print job is part of the composite job by recognizing an identifier in the location of the first non-print ready print job;
said second print system gateway determining that the second non-print ready print job is part of the composite job by recognizing the identifier in the location of the second non-print ready print job.

12. A method for compiling a multi-part print job, having two or more print job segments, to be printed, comprising:
(A) receiving a first non-print ready print job segment at a first print system gateway;
(B) determining, with the first print system gateway, that the first non-print ready print job segment is part of the multi-part print job;
(C) storing the first non-print ready print job segment in memory when it is determined that the first non-print ready print job segment is part of the multi-part print job;
(D) receiving a second non-print ready print job segment at a second print system gateway;
(E) determining, with the second print system gateway, that the second non-print ready print job segment is part of the multi-part print job;
(F) storing the second non-print ready print job segment in memory when it is determined that the second non-print ready print job segment is part of the multi-part print job, the first non-print ready print job segment being associated with the second non-print ready print job segment, the second non-print ready print job segment being received independently from the first non-print ready print job segment; and
(G) releasing, when a selected condition is met, first and second non-print ready print job segments, to a printing system, for processing as the multi-part print job.

13. The method of claim 12, further comprising:
(H) providing the first print system gateway with a first set of rules and the second print system gateway with a second set of rules, the first set of rules being used to determine that the first non-print ready print job segment is part of the multi-part print job, the second set of rules is used to determine that the second non-print ready print job segment is part of the multi-part print job.

14. The method of claim 13, wherein the first and second sets of rules are configured to recognize print job segments corresponding to more than one job submission mechanism type.

15. The method of claim 12, further comprising:
(H1) recognizing a context of the first non-print ready print job segment to the multi-part job; and
(I) recognizing the context of the second non-print ready print job segment to the multi-part job.

16. The method of claim 15, wherein recognizing a context of the first non-print ready print job segment to the multi-part job includes reading a code in the first non-print ready print job segment, and recognizing the context of the second non-print ready print job segment to the multi-part job includes reading a code in the second non-print ready print job segment.

17. The method of claim 12, wherein the selected condition is met when all print segments indicated in a list are stored in memory.

18. The method of claim 12, wherein the selected condition is met after a selected time interval has expired.

19. The method of claim 12, wherein the first and second non-print ready print job segments include a location;
said determining that the first non-print ready print job segment is part of the multi-part print job includes recognizing an identifier in the location of the first non-print ready print job segment;
said determining that the second non-print ready print job segment is part of the multi-part print job includes recognizing the identifier in the location of the second non-print ready print job segment.

20. The method of claim 19, wherein each location is preset;
said determining that the first non-print ready print job segment is part of the multi-part print job includes using the preset location of the first non-print ready print job segment to recognize the identifier;
said determining that the second non-print ready print job segment is part of the multi-part print job includes using the preset location of the second non-print ready print job segment to recognize the identifier.

21. The method of claim 19, further comprising:
(h) supplying both the first print system gateway with a first set of rules and the second print system gateway with a second set of rules, the first set of rules defining a way in which the first print system gateway is to search for the identifier and the second set of rules defining a way in which the second print system gateway is to search for the identifier.

22. The method of claim 21, wherein the first non-print ready print job segment and the second non-print ready print job segment are associated with a job submission type, the first set of rules and the second set of rules being configured to use the job submission type in searching for the identifier.

23. A method for compiling a composite print job, having two or more jobs, to be printed, comprising:
(A) receiving a first non-print ready print job at a first print system gateway;
(B) determining, with the first print system gateway, that the first non-print ready print job is part of the composite print job;
(C) storing the first non-print ready print job in memory when it is determined that the first non-print ready print job is part of the composite print job;
(D) receiving a second non-print ready print job at a second print system gateway;
(E) determining, with the second print system gateway, that the second non-print ready print job is part of the composite print job;
(F) storing the second non-print ready print job in memory when it is determined that the second non-print ready print job is part of the composite print job, the first non-print ready print job being associated with the second non-print ready print job, the second non-print ready print job being received independently from the first non-print ready print job; and
(G) releasing, when a selected condition is met, first and second non-print ready print jobs, to a printing system, for processing as the composite print job.

24. The method of claim 23, further comprising:
(H) providing the first print system gateway with a first set of rules and the second print system gateway with a second set of rules, the first set of rules being used to determine that the first non-print ready print job is part of the composite print job, the second set of rules is used to determine that the second non-print ready print job is part of the composite print job.

25. The method of claim 24, wherein the first and second sets of rules are configured to recognize print jobs corresponding to more than one job submission mechanism type.

26. The method of claim 23, wherein the first and second non-print ready print jobs include a location;
said determining that the first non-print ready print job is part of the composite print job includes recognizing an identifier in the location of the first non-print ready print job;
said determining that the second non-print ready print job is part of the composite print job includes recognizing the identifier in the location of the second non-print ready print job.

* * * * *